US012613691B2

(12) United States Patent
Valecha et al.

(10) Patent No.: US 12,613,691 B2
(45) Date of Patent: Apr. 28, 2026

(54) CONTEXT AWARE MULTI-LAYER CLIENT PROGRAMS IN DISTRIBUTED ENVIRONMENTS

(71) Applicant: International Business Machines Corporation, Armonk, NY (US)

(72) Inventors: Vinod A. Valecha, Pune (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/403,600

(22) Filed: Jan. 3, 2024

(65) Prior Publication Data
US 2025/0217131 A1 Jul. 3, 2025

(51) Int. Cl.
| | |
|---|---|
| *H04L 29/06* | (2006.01) |
| *G06F 8/65* | (2018.01) |
| *G06F 9/445* | (2018.01) |
| *G06F 11/34* | (2006.01) |

(52) U.S. Cl.
CPC ............ *G06F 8/65* (2013.01); *G06F 9/44505* (2013.01)

(58) Field of Classification Search
CPC .................................................. G06F 9/44505
See application file for complete search history.

(56) References Cited

U.S. PATENT DOCUMENTS

| | | | | |
|---|---|---|---|---|
| 9,424,021 | B2 * | 8/2016 | Zamir ...................... | H04L 67/10 |
| 12,399,746 | B1 * | 8/2025 | Pani ......................... | G06F 9/546 |

| | | | | |
|---|---|---|---|---|
| 2019/0155591 | A1 * | 5/2019 | Kumar .................... | G06F 11/34 |
| 2022/0116379 | A1 | 4/2022 | Rangain et al. | |
| 2025/0217131 | A1 * | 7/2025 | Valecha ................... | G06F 8/65 |

FOREIGN PATENT DOCUMENTS

| | | | | |
|---|---|---|---|---|
| CN | 105190557 | B | 9/2018 | |
| CN | 113542322 | A * | 10/2021 ............. | G06F 16/17 |
| CN | 115795478 | A * | 3/2023 | |

(Continued)

OTHER PUBLICATIONS

Zheng et al., "Location Based Handshake and Private Proximity Test with Location Tags," IEEE Transactions on Dependable and Secure Computing, Aug. 2015, pp. 1-14.

(Continued)

*Primary Examiner* — S. Sough
*Assistant Examiner* — Mohammad H Kabir

(57) ABSTRACT

A computer-implemented method (CIM), according to one approach, includes: receiving a context identity at a central server in response to a context handshake being initiated between a client and the central server. The context identity is received from the client and the context identity includes identifying details that are correlated with the client. The CIM also includes evaluating the context identity and determining a combination of layers to include in a client program. The combination of layers are determined based at least in part on the evaluation performed. The client program is generated by assembling the determined combination of layers. Moreover, the generated client program is deployed to the client. Furthermore, a communication channel is established between the client and the central server.

20 Claims, 4 Drawing Sheets

(56)               References Cited

FOREIGN PATENT DOCUMENTS

EP           2575323  A1      4/2013

OTHER PUBLICATIONS

Anonymous, "Using DNS Names as Client Identity Hints," IP.com Prior Art Database, Technical Disclosure No. PCOM000272108D, Apr. 13, 2023, 7 pages.

Dolati et al., "Layer-Aware Containerized Service Orchestration in Edge Networks," IEEE Transactions on Network and Service Management, 2022, pp. 1-16.

Go, "tls," Go.dev, 2023, 34 pages, retrieved from https://pkg.go.dev/crypto/tls on Oct. 12, 2023.

Anonymous, "Context-aware VM and application adaptation," IP.com Prior Art Database, Technical Disclosure No. IPCOM000239592D, Nov. 18, 2014, 6 pages.

Anonymous, "System and Method to propagate client-aware and context-aware information as part of XID in a distributed transaction in a cloud environment," IP.com Prior Art Database, Technical Disclosure No. IPCOM000243549D, Sep. 30, 2015, 7 pages.

Docker Docs, "Multi-stage builds," docker docs, 2023, 6 pages, retrieved from https://docs.docker.com/build/building/multi-stage/.

\* cited by examiner

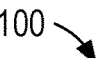

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

IMPROVED PROGRAM FUNCTIONALITY CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

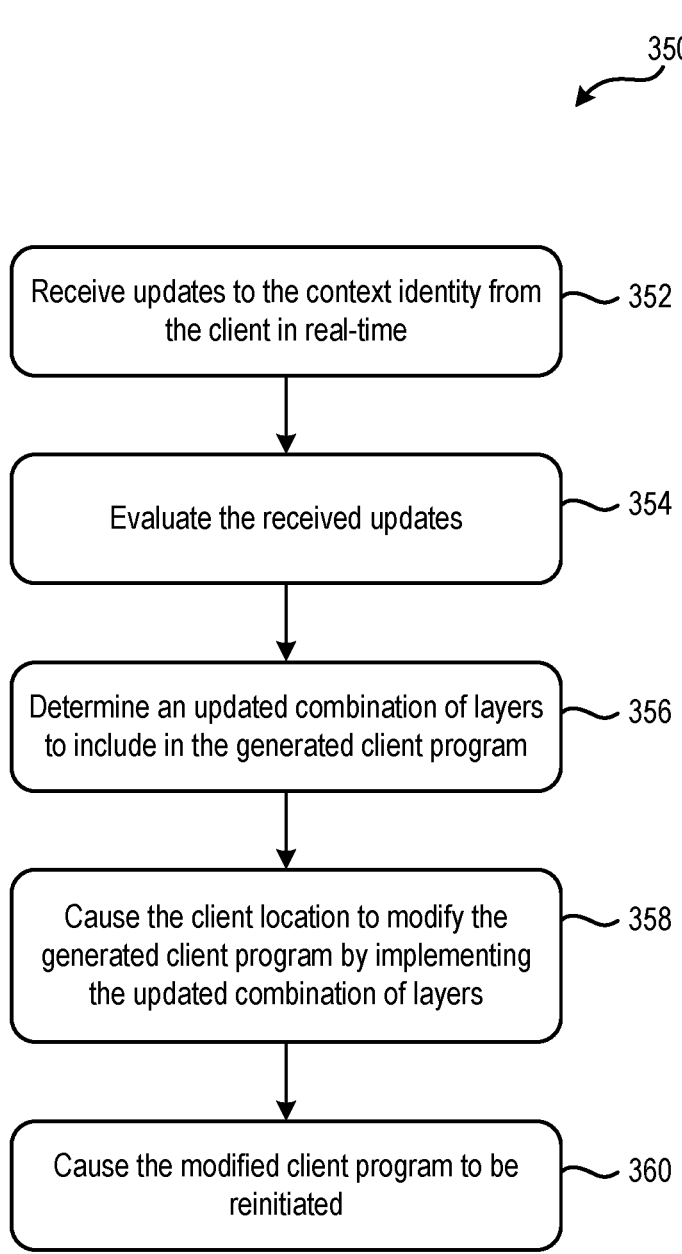

350

Receive updates to the context identity from the client in real-time ~ 352

Evaluate the received updates ~ 354

Determine an updated combination of layers to include in the generated client program ~ 356

Cause the client location to modify the generated client program by implementing the updated combination of layers ~ 358

Cause the modified client program to be reinitiated ~ 360

FIG. 3B

CONTEXT AWARE MULTI-LAYER CLIENT PROGRAMS IN DISTRIBUTED ENVIRONMENTS

BACKGROUND

The present invention relates to multi-layered programs, and more specifically, this invention relates to implementing context aware multi-layer client programs in distributed environments.

Client programs refer to programs that are capable of obtaining services that are provided by other programs. These other programs are often referred to as sever programs. In situations where the client program and server program implement different runtimes, the programs usually talk over sockets using various protocols to facilitate the communication therebetween. Furthermore, a program "build" refers to the process of creating and packaging a working program in a shippable manner for a software release. This may be achieved by taking relevant source code files and further compiling them to create a build artifact, e.g., such as an executable file.

While building simple programs having limited components is a relatively straightforward process, builds becomes increasingly complex and resource intensive as the number of components in the program increases. Additionally, while builds were previously performed in a dedicated machine or environment, client programs are now often run in a variety of different contexts. For example, in addition to being run on a local (e.g., private) environment, a client program may be run on an open network in order to provide a public demonstration. In another example, client programs may be run on a closed and secured network while performing lab experiments, e.g., such as performance testing. In still another example, a client program may be installed in a moving edge environment. A need for programs that may efficiently be performed across a number of different environments thereby exists.

SUMMARY

A computer-implemented method (CIM), according to one approach, includes: receiving a context identity at a central server in response to a context handshake being initiated between a client and the central server. The context identity is received from the client and the context identity includes identifying details that are correlated with the client. The CIM also includes evaluating the context identity and determining a combination of layers to include in a client program. The combination of layers are determined based at least in part on the evaluation performed. The client program is generated by assembling the determined combination of layers. Moreover, the generated client program is deployed to the client. Furthermore, a communication channel is established between the client and the central server.

A computer program product (CPP), according to another approach, includes: a set of one or more computer-readable storage media, as well as program instructions. The program instructions are collectively stored in the set of one or more storage media, for causing a processor set to perform the foregoing CIM.

A computer system (CS), according to yet another approach, includes: a processor set, and a set of one or more computer-readable storage media. The CS also includes program instructions that are collectively stored in the set of one or more storage media, for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3B is a flowchart of a method, in accordance with one approach.

DETAILED DESCRIPTION

Figure 2:
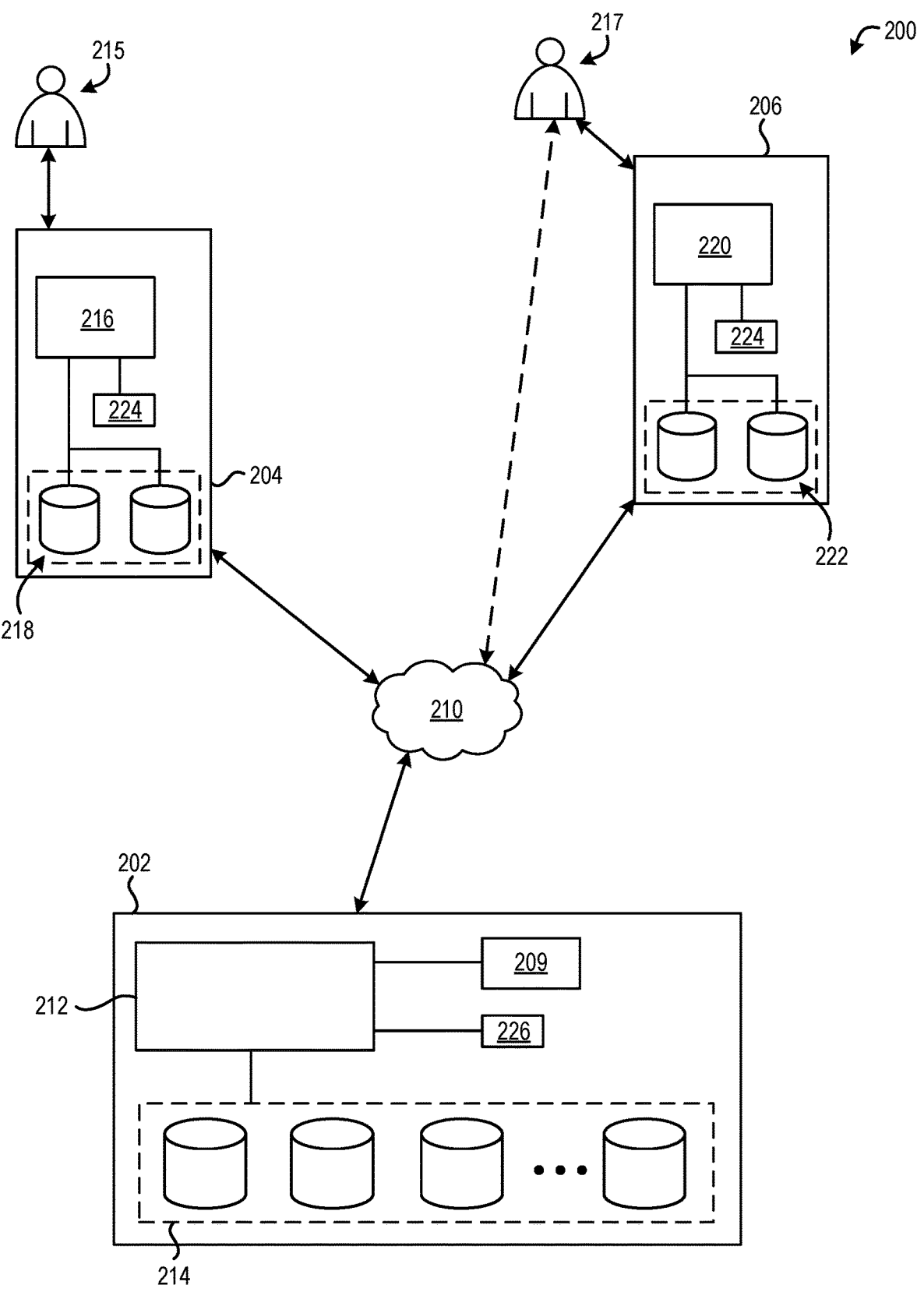
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for dynamically adjusting client program functionality based on the context in which the program is implemented. For instance, a client may provide details in real-time describing the environment in which the program is being run. Thus, as a program is run in different situations, the capabilities of (e.g., layers in) the program may be adjusted to ensure a balance between performance capabilities and efficient use of resources, e.g., as will be described in further detail below.

In one general approach, a CIM includes: receiving a context identity at a central server in response to a context handshake being initiated between a client and the central server. The context identity is received from the client and the context identity includes identifying details that are correlated with the client. The CIM also includes evaluating the context identity and determining a combination of layers to include in a client program. The combination of layers are determined based at least in part on the evaluation performed. The client program is generated by assembling the determined combination of layers. Moreover, the generated client program is deployed to the client. Furthermore, a communication channel is established between the client and the central server.

In another general approach, a CPP includes: a set of one or more computer-readable storage media, as well as program instructions. The program instructions are collectively stored in the set of one or more storage media, for causing a processor set to perform the foregoing CIM.

In yet another general approach, a CS includes: a processor set, and a set of one or more computer-readable storage media. The CS also includes program instructions that are collectively stored in the set of one or more storage media, for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved program functionality code at block 150 for dynamically adjusting client program functionality based on the context in which the program is implemented. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine (VM) set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of VMs from VM set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are VMs and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, a "client program" refers to a program that is capable of obtaining a service that is provided by another program often referred to as a sever program. In situations where the client program and server program implement different runtimes, the programs usually talk over sockets using various protocols to facilitate the communication therebetween. Furthermore, a program "build" refers to the process of creating and packaging a working program in a shippable manner for a software release. This may be achieved by taking relevant source code files and further compiling them to create a build artifact, e.g., such as an executable file.

While building simple programs having limited components is a relatively straightforward process, builds becomes increasingly complex and resource intensive as the number of components in the program increases. Additionally, while builds were previously performed in a dedicated machine or environment, client programs are now often run in a variety of different contexts. For example, in addition to being run on a local (e.g., private) environment, a client program may be run on an open network in order to provide a public demonstration. In another example, client programs may be run on a closed and secured network while performing lab experiments, e.g., such as performance testing. In still another example, a client program may be installed in a moving edge environment. It should be noted that "environment" as used herein is intended to refer to any collection of logical and/or physical compute components that are able to support the processing and exchange of electronic information to achieve a set of ordered operations or perform a program.

Although applicability of client programs has increased as a result of being run in a variety of different contexts, conventional products have been unable to adjust functionality once the client program has been installed. Conventional products have thereby been forced to develop client programs that include the components needed to operate in a variety of different contexts, regardless of how a client program is actually used. In other words, conventional products have been unable to polymorphically adapt to varying contexts. As a result, conventional programs are often overly complex (e.g., bulky), resulting in unnecessary consumption of system resources.

In sharp contrast, approaches herein are desirably able to dynamically adjust client program functionality based on the context in which the program is implemented. For instance, a client may provide details in real-time describing the environment in which the program is being run. Thus, as a program is run in different situations, the capabilities of (e.g., layers in) the program may be adjusted to ensure a balance between performance capabilities and efficient use of resources, e.g., as will be described in further detail below.

Looking now to FIG. 2, a representational view of a distributed system 200 is shown in accordance with one approach. As an option, the present system 200 may be implemented in conjunction with features from any other approach listed herein, such as those described with reference to the other FIGS. However, this system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a number of physical components therein. For instance, the system 200 is illustrated as including a central server 202 (e.g., a central cluster) that is connected to a first client location 204 and a second client location 206. In the present approach, the central server 202, first client location 204, and second client location 206 are each connected to a network 210. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc., may be sent between the client locations 204, 206, and/or 202, regardless of the amount of separation which exists therebetween, e.g., despite being positioned at different geographical locations.

It should also be noted that two or more of the client locations 204, 206 and central server 202 may be connected to each other differently depending on the approach. According to an example, which is in no way intended to limit the invention, two or more client locations (e.g., edge nodes) may be located relatively close to each other and connected by a wired connection, e.g., a cable, a fiber-optic link, a wire, etc., or any other type of connection which would be apparent to one skilled in the art after reading the present description.

It should also be noted that the term "client" as used herein may include one or more pieces of computer hardware or software at a remote client location (e.g., cluster) that are configured to run one or more client programs. Thus, in some approaches, a "client" is a computer, computer hardware, computer software, etc., that is configured to run a multilayer client program. It follows that the client may serve as a representation for an individual user, a corporation, another running application, etc., depending on the given approach.

With continued reference to FIG. 2, the first and second client locations 204, 206 may have a different configuration than the central server 202. For instance, the first client location 204 includes a processor 216 coupled to memory 218, and the second client location 206 includes a processor 220 coupled to memory 222. The memory implemented at each of the client locations 204, 206 may be used to store a variety of data and information. In some approaches, the client locations 204, 206 may store at least some information associated with clients 215, 217 and/or the corresponding client locations 204, 206 themselves. Identifying details that are correlated with client programs that are running at the respective client locations 204, 206 may also be stored in the respective memory 218, 222 and updated dynamically over time as details associated with the client programs change. The identifying details may also be correlated with the client programs themselves and stored in the respective memory 218, 222. For instance, unused layers that are compatible with a client program may be stored in memory and used to modify the capabilities of the client program.

Depending on the approach, the identifying details may include a geolocation at which a respective client program is running or intended to run, available compute resources (e.g., CPU bandwidth, storage capacity in memory, etc.) at locations that the respective client programs are running or intended to run, security-related details associated with the environments that client programs are running or intended to run (e.g., encryption algorithms that are supported), information describing the operating systems on which the respective client programs are running or intended to run, etc., or any other relevant contextual parameters that are correlated with the environments in which client programs are implemented. According to an example, which is in no way intended to be limiting, a client program may determine its own geolocation using GPS coordinates and may extract system information, e.g., such as CPU type and available RAM, from the environment in which it is running.

The identifying details thereby desirably provide insight related to the environment in which a client program is implemented (e.g., running or intended to run). This insight is particularly valuable in order to determine what functionality a client program should support in a given environment or context.

For instance, in response to receiving context identity at the central server 202 from client location 204, the central server 202 parses and processes the identifying information in the context identity to determine the appropriate layers and configuration for a client program intended to run at the client location 204. The central server 202 may further develop correlations between certain layers of a client program and the environments (e.g., contexts) in which the client programs are implemented.

In some approaches, the central server 202 may maintain a mapping in memory (e.g., data storage array 214) of client layers and the contextual situations in which they are deployed and/or requested. In some approaches the mapping may be specific to different types of environments. In other approaches, general mapping of layers to relevant context may be given by a provider. This mapping allows the central server to determine the appropriate layers to be enabled or disabled in a client program based at least in part on the specific context identified during the context handshake. According to a non-limiting example, the mapping may specify that in situations where a client program is running on a closed and secured network, both optimization layers are preferably enabled in the client program, as well as the existing layers.

According to an example which is in no way intended to be limiting, the central server 202 analyzes the received context identity and determines that the client program should include two security layers enabled based on detecting the client program will be interacting with an unknown network. However, in another situation the central server 202 may analyze the received context identity and determine that the client program need not include any security layers enabled based on detecting the client program will be running in a trusted and secure environment, e.g., such as a trusted execution environment. According to an in-use example, which is in no way intended to be limiting, a client program may at least include a basic layer, a first functional layer, a second functional layer, a first security layer, a second security layer, a first optimization layer, a second optimization layer, and a network intrusion detection and prevention layer.

In addition to modifying the layers of a client program based on the environment the program is intended to be deployed, the layers in the client program may be dynamically updated as details change over time. For instance, a client program may be moved to a different environment, the environment in which the program is running may be modified (e.g., security settings of the environment may be adjusted in response to a predetermined condition being met), instructions may be received from a client and/or administrator of the environment in which the program is running, additional programs may be initiated in the same environment, etc. Accordingly, each of the client locations are preferably able to monitor client programs that are running and provide updates to the central server.

Referring still to FIG. 2, client locations 204, 206 are each shown as including a context adaptor component 224 (e.g., context adaptor module). The context adaptor component 224 preferably monitors client programs, as well as the respective client locations 204, 206 at which the client programs are running, to identify changes that occur over time, e.g., as noted above. Changes that have an impact on a client program are preferably returned to the central server 202 for evaluation and to determine whether the layers in and/or the configuration of the client program should be modified as a result.

In some approaches, a context adaptor component 224 is included as part of the program packaging which establishes handshakes to the central server 202 based on contextual details. Accordingly, the context adaptor components 224 may initiate a context handshake with the central server 202 in an attempt to create a communication channel over which updates to the client program may be relayed to the central server 202. In turn, the central server 202 may be able to evaluate the updates, determine changes that should be made to the layers in the client program, and send instructions (e.g., control commands) to the context adaptor components 224 that result in the client programs being modified based on the updates.

The context adaptor components 224 may also be able to repackage the layers in a client program locally and automatically reinitiate the repackaged program. Thus, in some approaches a context adaptor component 224 may remove one or more layers from a client program that are determined as being unnecessary for the current environment in which the client program is being run. In other approaches, the context adaptor component 224 may download new layers that are available for (e.g., correspond to) a client program and assemble the client program using the downloaded layers. The context adaptor component 224 may further automatically reinitiate the repackaged program in response to performing the layer addition(s) and/or layer removal(s). This desirably reduces network traffic and latency that would otherwise be experienced as a result of sending the client program back to a central location for modification, before being returned to the client location.

The central server 202 includes a context handshake capability module 226 that communicates with the context adaptor components 224 at the client locations 204, 206. The context handshake capability module 226 may work in conjunction with the context adaptor components 224 to evaluate context handshake requests and establish communication channels therebetween. The central server 202 also includes a large (e.g., robust) processor 212 that is coupled to a cache 209 and a data storage array 214 having a relatively high storage capacity (e.g., at least a higher storage capacity than the cache 209). The central server 202 is thereby able to process and store a relatively large amount of data, allowing it to be connected to, and manage, multiple different client locations (e.g., edge node servers) and the client programs that are running there.

It follows that approaches herein are desirably able to dynamically adjust client program functionality based on the context (or environment) in which the program is implemented. For instance, a client may provide details in real-time describing the environment in which the program is being run. Thus, as a program is run in different environments, the capabilities of the program (e.g., the layers in the program) may be adjusted to ensure a balance between performance capabilities and efficient use of resources.

Figure 3A:
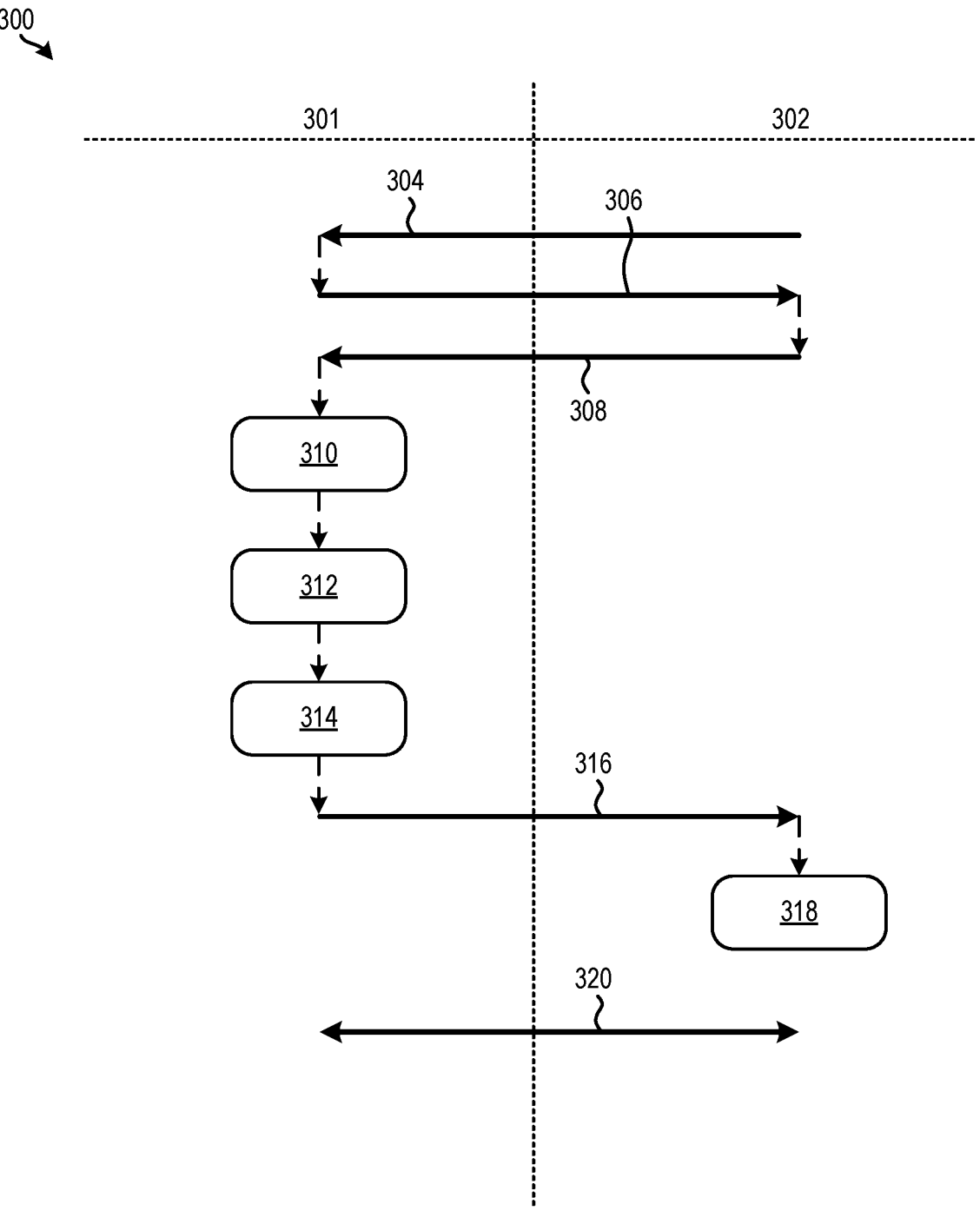
FIG. 3A is a flowchart of a method, in accordance with one approach.

Referring now to FIG. 3A, a computer-implemented method 300 for dynamically adjusting client program functionality based on the context in which the program is implemented, is illustrated in accordance with one approach. This desirably avoids situations where client programs are overly complex (e.g., bulky) for the respective contexts in which they are running. As a result, performance as a whole is improved by avoiding unnecessary functionality. The method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. For example, each of the nodes 301, 302 shown in the flowchart of method 300 may correspond to one or more processors, controllers, computers, etc., positioned at a different location of a distributed system (e.g., as seen in FIG. 2).

For instance, node 301 may include one or more processors at a central server (e.g., see central server 202 of FIG. 2 above). Moreover, node 302 may include one or more processors at a client location of a distributed system (e.g., see remote client locations 204, 206 of FIG. 2 above). It follows that commands, data, requests, etc. may be sent between the nodes 301, 302 depending on the approach. It should be noted that the various processes included in method 300 are in no way intended to be limiting, e.g., as would be appreciated by one skilled in the art after reading the present description. For instance, data sent from node 302 to node 301 may be prefaced by a request sent from node 301 to node 302 in some approaches.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking specifically now to the flowchart, the client location at node 302 initiates a context handshake by sending a request to the central server at node 301. See operation 304. In response to receiving the context handshake request at node 301, a request for a context identity is returned to node 302. See operation 306. In some approaches, the client location generates the context identity in response to receiving the request at operation 306. In other approaches, the context identity may be predetermined and automatically sent from node 302 to node 301 in response to the context handshake request being sent. In still other approaches, the context identity may be sent to node 301 along with the initial context handshake request.

Proceeding to operation 308, a context identity which includes identifying details that are correlated with the client location at node 302, is received at node 301. In some approaches, the context identity is sent to node 301 using a context handshake protocol, e.g., as would be appreciated by one skilled in the art after reading the present description. As noted above, the identifying details may include a variety of different information that is correlated with the environment in which a client program is running or intended to run. Depending on the approach, the identifying details may include a geolocation of the client location (e.g., environment) at which a respective client program is running or intended to run, available compute resources (e.g., CPU bandwidth, storage capacity in memory, etc.) at locations that the respective client programs are running or intended to run, security-related details (e.g., security settings) associated with the environments that client programs are running or intended to run (e.g., encryption algorithms that are supported by a client location), information describing the operating systems on which the respective client programs are running or intended to run, etc., or any other relevant contextual parameters that are correlated with the environments in which client programs are implemented.

The identifying details thereby desirably provide insight related to the environment in which a client program is implemented (e.g., running or intended to run). This insight is particularly valuable in order to determine what functionality a client program should support in a given environment or context. Accordingly, operation 310 includes evaluating the context identity received from node 302. In other words, the central server at node 301 parses and processes the identifying information in the context identity received from node 302 to determine the appropriate layers for and configuration of a client program intended to run at node 302.

From operation 310, method 300 advances to operation 312. There, operation 312 includes determining a combination of layers to include in a client program, based at least in part on the evaluation performed in operation 310. Operation 312 may also include determining a desired configuration of the client program, based at least in part on the evaluation performed in operation 310.

As noted above, a central processing location (e.g., see central server 202 of FIG. 2) may develop correlations between certain layers of a client program and the environments (e.g., contexts) in which the client program is implemented. In some approaches, the central location may maintain a mapping in memory of client layers and the contextual situations in which they are successfully deployed and/or intentionally requested. According to an example which again is in no way intended to be limiting, node 301 may analyze the context identity received from node 302 and determine that a client program intended to run at node 302 should include two functional layers enabled based on detecting node 302 does not automatically enable the functionality enabled by the two functional layers. However, in another situation the central server at node 301 may analyze the received context identity and determine that a client program need not include an optimization layer enabled.

In some approaches, the central server at node 301 may develop one or more machine learning models that are able to evaluate the context identity received from node 302 and automatically identify layers that should be included in the client program. The machine learning models may be trained using training data from a repository, over time based on performance of client programs and/or tendencies of the environments in which the programs are implemented, etc. It follows that performing operation(s) 310 and/or 312 may involve one or more machine learning models, e.g., as would be appreciated by one skilled in the art after reading the present description. However, in other approaches statistical models, client preferences, predetermined policies established by a system administrator, etc., may be used to determine the specific layers that should be included in a client program, based at least in part on the environment in which the client program is intended to run.

In response to determining the layers that should be included in a client program, method 300 advances to operation 314. There, operation 314 includes generating the client program by assembling the determined combination of layers. In other words, operation 314 includes combining the layers determined in operation 312 into a multi-layered client program that has desired functionality. As indicated above, the layers that are assembled to create the desired client program may include basic functionality, specific features, security enhancements, optimization techniques, etc., or any other relevant components.

In some approaches, the process of generating (e.g., creating) the multi-layer client program involves using a multi-stage container build to actually assemble the determined combination of layers. In other words, in some approaches it is possible to design a build process in a multi-stage method for which each stage corresponds to a different program layer, and may achieve a particular repeatable part of the overall build process. In some approaches, the build process of the multi-stage container involves creating separate container images for the basic layer, functional layers, security layers (e.g., which may include a network intrusion detection and prevention layer), and optimization layers. These container images may further be assembled to form the complete client program. According to an in-use example, which is in no way intended to be limiting, a multi-layer client program may be created using multi-stage Docker™ builds, e.g., as would be appreciated by one skilled in the art after reading the present description.

In response to generating the client program having the desired combination of functional layers, method 300 advances to operation 316. There, operation 316 includes deploying the generated client program to the client. In other words, operation 316 includes sending the generated multi-layer program to the client location at node 301 that initially issued the context handshake. Accordingly, the multi-layer program may be implemented at node 301 in response to being received there. For instance, operation 318 includes storing the multi-layer client program in local memory at node 302, such that the program may be initiated and run as desired, e.g., by one or more processors at node 302.

Furthermore, operation 320 includes establishing a communication channel between nodes 301 and 302. In other words, operation 320 creates a communication channel between the client location at node 301 and the central server at node 302. In preferred approaches, a context adaptor component of the client location at node 302 initializes and establishes the communication channel with the central server at node 301. This communication channel desirably allows for information to be shared between the two locations. For instance, changes at the client location may be relayed back to the central server and used to determine whether any modifications should be made to the previously generated client program. As noted above, the layers in the client program may be dynamically updated as details correlated with the environment in which the program is running (or intended to run) change over time. For instance, a client program may be moved to a different environment, the environment in which the program is running may be modified (e.g., security settings of the environment may be adjusted in response to a predetermined condition being met), instructions may be received from a client and/or administrator of the environment in which the program is running, additional programs may be initiated in the same environment, etc.

Accordingly, the client location at node 302 is preferably able to monitor client programs that are running and provide updates about the environment to the central server at node 301 over the communication channel established in operation 320. In response to receiving updates to the environment in which a client program is running or intended to run, node 301 may return instructions to modify the layers in the client program, e.g., as will soon become apparent.

Looking now to FIG. 3B, a flowchart of a method 350 for evaluating changes to the environment in which a client program is running (or intended to run) is illustrated in accordance with one approach. It follows that one or more of the operations in method 350 may be performed in the background so as not to disrupt ongoing system performance. However, in response to identifying a situation where changes should be made to the client program, method 350 may impact performance by causing the changes to be made at the client location. It follows that one or more of the operations in method 350 may be performed at node 301 of FIG. 3A. However, it should be noted that the operations of FIG. 3B are illustrated in accordance with one embodiment which is in no way intended to be limiting.

As shown, method 350 includes receiving updates to the context identity from the client in real-time. See operation 352. In other words, operation 352 includes receiving information that outlines changes to the environment in which a client program is running or intended to run. As noted above, these updates may be received from the client locations directly over communication channels that extend between the central server and the respective client locations.

Operation 354 further includes evaluating the received updates. In response to evaluating the updates to the context identity originally received, operation 356 includes determining an updated combination of layers to include in the generated client program. In some approaches, operation 356 also includes determining an updated configuration of the generated client program, based at least in part on the evaluation of the updates to the context identity. Again, by monitoring client programs and providing updates about the environments in which the client programs are implemented, the configuration (e.g., capabilities) of the client programs may be modified by adjusting the layers that are in the client program.

It follows that in some approaches, operation 356 determines that one or more of the existing layers in the client program should be removed in response to the identified changes to the client location. Operation 356 may also or alternatively determine that one or more new layers should be added to the client program in response to the identified changes to the client location.

Proceeding to operation 358, there the central location causes the client location to modify the generated client program by implementing the updated combination of layers. Operation 358 may thereby include sending one or more instructions to the client location that cause the client location to perform one or more desired changes to the client program. In preferred approaches, the one or more instructions are sent to the context adaptor component at the client location for implementation. It follows that in some approaches, operation 358 includes sending one or more instructions to the client location that cause the client location to remove one or more specific layers from the generated client program. In other approaches, operation 358 includes sending one or more instructions to the client location that cause the client location to add one or more new layers to the generated client program. However, it should be noted that operation 358 may include sending instructions that cause the client location to remove one or more layers from the existing client program, in addition to adding one or more layers to the client program, thereby producing a desired change to the functionality of the client program.

In situations that involve adding one or more new layers to the client program, some implementations actually send the new layers that are being added to the generated client program to the client location. In other implementations, the new layers may be extracted from storage in memory at the client location itself, e.g., as previously mentioned. In still other approaches, new layers may be received from another client location that shares an efficient communication channel with the client location performing the client program update.

Referring still to FIG. 3B, method 350 advances from operation 358 to operation 360. There, operation 360 includes causing the modified client program to be reinitiated. Operation 360 may thereby include sending one or more instructions that cause the client location to reinitiate the modified client program. However, in some approaches the client location may be configured to automatically reinitiate a client program following a modification. For instance, a context adaptor component at the client location (e.g., see context adaptor component 224 of FIG. 2) may be able to automatically reinitiate the client program in response to modifying the program as instructed. This ensures that the client program remains in sync with the instructions received from the central server, and that the client program dynamically reflects the current (e.g., latest) layer configuration.

It follows that approaches herein are able to dynamically aggregate layers of a client program, and dynamically decorate the functionality and capabilities of the client program based on the identified context. This allows the client program to adapt its behavior and feature set to match the specific details of the environment it is operating in. According to a non-limiting example, in response to a client program detecting that it has entered a resource-constrained environment, it can dynamically add optimization layers to enhance its performance in that specific context. Moreover, in response to being instructed by the server, the client context adaptor component can self-adjust and shrink the client program by removing unnecessary layers. This ensures that the client program remains lean and efficient, tailored to its current context. According to another non-limiting example, a central server may determine that the client program no longer needs optimization layers due to improved network conditions. The central server may thereby send a control message to the context adaptor component corresponding to the client program, causing optimization layers to be removed from the client program. It should be noted that "removing" a layer of a client program as used herein preferably involves extracting the layer from the client program such that it is no longer included in the program layer stack. While the extracted layers may be discarded in some approaches, in other approaches the extracted layers may be returned to the central server, stored in local memory at the client location (e.g., to add back into the client program), etc.

It follows that context adaptor components as described herein are able to dynamically adapt to changing conditions and/or environments. For instance, security measures may change based on the identified context. In different approaches, context adaptor components can adjust encryption algorithms, access control policies, authentication mechanisms, etc., to match the security elements of the environment in which the client program is running or will run. According to yet another non-limiting example, in response to the client program detecting that it is operating on an open network, the context adaptor component may switch to a more robust encryption algorithm and enforce stricter access control measures.

Approaches herein may also be particularly advantageous in edge computing scenarios. For instance, the context adaptor components can adapt the behavior and functionality of the client program to leverage edge computing capabilities, enhancing performance and responsiveness in these distributed environments. For example, the context adaptor component may identify that a client program is running on a moving edge device with limited connectivity. The context adaptor component may thereby dynamically adjust the communication protocols and data processing strategies to optimize performance and minimize network dependencies.

The approaches herein are thereby able to continuously adapt and perform contextual monitoring of the client program. A context adaptor component preferably remains active throughout the lifecycle of a corresponding client program, continuously monitoring the environment and adjusting the behavior and configuration of the client program over time. For instance, a context adaptor component preferably periodically reevaluates the context of a client location, and compares it with the latest instructions that were issued. The context adaptor component thereby dynamically adapts the layers, settings, and behavior of the client program to ensure it remains in sync with the changing contextual environment in which the client program is implemented, e.g., as described herein.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), comprising:
   in response to a context handshake being initiated between a client and a central server, receiving at the central server a context identity from the client, wherein the context identity includes identifying details that are correlated with the client;
   evaluating the context identity;
   determining a combination of layers to include in a client program, based at least in part on the evaluation;
   generating the client program by assembling the determined combination of layers;
   deploying the generated client program to the client; and
   establishing a communication channel between the client and the central server.

2. The CIM of claim 1, further comprising:
   in response to deploying the generated client program to the client, receiving updates to the context identity from the client;
   in response to evaluating the updates to the context identity, determining an updated combination of layers to include in the generated client program;
   causing the client to modify the generated client program by implementing the updated combination of layers; and
   causing the modified client program to be reinitiated.

3. The CIM of claim 2, wherein the updates to the context identity are received in real-time from a context adaptor component, wherein the context adaptor component initiates the context handshake between the client and the central server.

4. The CIM of claim 3, wherein the communication channel is established in response to the generated client program being deployed to the client.

5. The CIM of claim 3, wherein the causing the client to modify the generated client program by implementing the updated combination of layers includes:
   using the context adaptor component to send one or more instructions to the client to remove one or more layers from the generated client program.

6. The CIM of claim 5, wherein the causing the client to modify the generated client program by implementing the updated combination of layers includes:
   using the context adaptor component to send one or more instructions to the client to add one or more new layers to the generated client program; and
   using the context adaptor component to send at least one of the one or more new layers to the client.

7. The CIM of claim 1, wherein the context identity includes identifying details selected from the group consisting of: a client geolocation, client resources, client security settings, and a client operating system.

8. The CIM of claim 1, wherein the generating of the client program includes:

using a multi-stage container build to assemble the deter-
mined combination of layers, by:
  creating container images for the respective layers in
    the determined combination of layers, and
  combining and integrating the container images into the
    generated client program.
9. A computer program product (CPP), comprising:
a set of one or more computer-readable storage media;
  and
program instructions, collectively stored in the set of one
  or more storage media, for causing a processor set to
  perform the following computer operations:
  in response to a context handshake being initiated
    between a client and a central server, receive at the
    central server a context identity from the client,
    wherein the context identity includes identifying
    details that are correlated with the client;
  evaluate the context identity;
  determine a combination of layers to include in a client
    program, based at least in part on the evaluation;
  generate the client program by assembling the deter-
    mined combination of layers;
  deploy the generated client program to the client; and
  establish a communication channel between the client
    and the central server.
10. The CPP of claim 9, further comprising program
instructions, collectively stored in the set of one or more
storage media, for causing the processor set to perform the
following computer operations:
  receive updates to the context identity from the client
    having the generated client program;
  in response to evaluating the updates to the context
    identity, determine an updated combination of layers to
    include in the generated client program as well as a
    configuration of the generated client program;
  cause the client to modify the generated client program by
    implementing the updated combination of layers; and
  cause the modified client program to be reinitiated.
11. The CPP of claim 10, wherein the updates to the
context identity are received in real-time from a context
adaptor component.
12. The CPP of claim 11, wherein the context adaptor
component initiates the context handshake between the
client and the central server.
13. The CPP of claim 10, wherein the causing the client
to modify the generated client program by implementing the
updated combination of layers includes:
  sending one or more instructions to the client to remove
    one or more layers from the generated client program.
14. The CPP of claim 13, wherein the causing the client
to modify the generated client program by implementing the
updated combination of layers includes:
  sending one or more instructions to the client to add one
    or more new layers to the generated client program; and
  sending at least one of the one or more new layers to the
    client.
15. The CPP of claim 9, wherein the context identity
includes identifying details selected from the group consist-
ing of: a client geolocation, client resources, client security
settings, and a client operating system.
16. The CPP of claim 9, wherein generating of the client
program includes:
  using a multi-stage container build to assemble the deter-
    mined combination of layers.

17. A computer system (CS), comprising:
a processor set;
a set of one or more computer-readable storage media;
program instructions, collectively stored in the set of one
  or more storage media, for causing the processor set to
  perform the following computer operations:
  in response to a context handshake being initiated
    between a client and a central server, receive at the
    central server a context identity from the client,
    wherein the context identity includes identifying
    details that are correlated with the client;
  evaluate the context identity;
  determine a combination of layers to include in a client
    program, based at least in part on the evaluation;
  generate the client program by assembling the deter-
    mined combination of layers;
  deploy the generated client program to the client; and
  establish a communication channel between the client
    and the central server.
18. The CS of claim 17, further comprising program
instructions, collectively stored in the set of one or more
storage media, for causing the processor set to perform the
following computer operations:
  receive updates to the context identity from the client;
  in response to evaluating the updates to the context
    identity, determine an updated combination of layers to
    include in the generated client program as well as a
    configuration of the generated client program;
  cause the client to modify the generated client program by
    implementing the updated combination of layers; and
  cause the modified client program to be reinitiated.
19. The CS of claim 18, wherein the updates to the context
identity are received in real-time from a context adaptor
component, wherein the context adaptor component initiates
the context handshake between the client and the central
server.
20. The CS of claim 17, further comprising program
instructions, collectively stored in the set of one or more
storage media, for causing the processor set to perform the
following computer operations:
  in response to deploying the generated client program to
    the client, receive updates to the context identity from
    the client;
  in response to evaluating the updates to the context
    identity, determine an updated combination of layers to
    include in the generated client program;
  cause the client to modify the generated client program by
    implementing the updated combination of layers; and
  cause the modified client program to be reinitiated,
  wherein generating of the client program includes:
  using a multi-stage container build to assemble the deter-
    mined combination of layers,
  wherein the causing the client to modify the generated
    client program by implementing the updated combina-
    tion of layers includes:
  sending one or more instructions to the client to remove
    one or more layers from the generated client program;
  sending one or more instructions to the client to add one
    or more new layers to the generated client program; and
  sending at least one of the one or more new layers to the
    client.

* * * * *